United States Patent [19] [11] 3,712,542
Price, Jr. [45] Jan. 23, 1973

[54] FOG DISPERSAL SYSTEM

[75] Inventor: Frank C. Price, Jr., Santa Ana, Calif.

[73] Assignee: Ultrasystems, Inc., Newport Beach, Calif.

[22] Filed: March 15, 1971

[21] Appl. No.: 124,238

Related U.S. Application Data

[63] Continuation-in-part of Ser. No. 47,422, June 18, 1970, abandoned.

[52] U.S. Cl. ....................................239/2 R, 239/14
[51] Int. Cl. ..............................................E01h 13/00
[58] Field of Search ................................239/2 R, 14

[56] References Cited

UNITED STATES PATENTS

| | | | |
|---|---|---|---|
| 2,052,626 | 9/1936 | Houghton | 239/2 R |
| 2,465,587 | 3/1949 | Hartley et al. | 239/2 R X |
| 2,510,118 | 6/1950 | Kooistra | 239/2 R X |

OTHER PUBLICATIONS

Air Force Survey in Geophysics No. 106, Sept. 1958 pp. 3–9 and pp. 29–34 – Author–Major Currie S. Downie, U.S.A.F., Robert B. Smith

*Primary Examiner*—M. Henson Wood, Jr.
*Assistant Examiner*—John J. Love
*Attorney*—Fulwider, Patton, Rieber, Lee & Utecht

[57] ABSTRACT

A fog dispersal system for an aircraft runway or the like and including an arrangement of heaters of various intensities distributed along the sides of the runway, the heaters producing plumes of heated air which rise to different levels according to their intensity and expand and merge over the runway in adjoining layered relation. The plumes from the larger heaters rise and diffuse to a higher altitude compared to the plumes of heated air from the smaller heaters. The resulting generally horizontally oriented layered plumes of heated air over the runway heat the air to an extent sufficient to clear it of fog droplets. Automatic means are provided to select the appropriate heaters and the intensity of their burning to suit any one of several combinations of wind velocity and direction. One embodiment provides for the addition of fog dispersal particles to each heater effluent so that the particles rise and diffuse with the warm plume.

9 Claims, 4 Drawing Figures

INVENTOR.
FRANK C. PRICE JR.
BY Fulwider, Patton, Rieber, Lee and Utecht
ATTORNEYS INVENTOR.
FRANK C. PRICE JR.
BY Lulwider, Patton, Rieber, Lee and Utecht
ATTORNEYS

FOG DISPERSAL SYSTEM

CROSS-REFERENCE TO RELATED APPLICATION

This is a continuation-in-part of U.S. patent application Ser. No. 47,422, filed June 18, 1970 now abandoned, and the benefit of the filing date thereof is claimed for the subject matter which is common to that application and the present application.

BACKGROUND OF THE INVENTION

1. Field of the Invention

The present invention relates to fog dispersal systems and particularly to a system which disperses fog by supplying heat to the air mass containing the fog.

2. Description of the Prior Art

Fog can be cleared from an air mass such as the corridor of air over an airport runway by warming the air approximately 3 to 5 degrees Fahrenheit. In the past, systems to disburse fog by the addition of heat have not been practical for use by most airports. The systems of the prior art have proved to be prohibitively expensive and incapable of automatic or "push-button" operation to clear fog under various conditions of wind direction and velocity. Some of these previous systems were impractical because of the large quantities of fuel which they required to transport the heat to the higher altitudes under wind conditions. Moreover, they did not take into account important design needs to obtain the required vertical and horizontal heat dispersion under varying wind conditions. Other prior art systems were impractical because of the expensive blowers and jet engines upon which they were dependent to force heated air to the proper location.

More particularly, one system of the prior art thrusts heat into the runway air corridor by means of many jet engines arranged along the runway. This system provides reasonably efficient utilization of the available heat, but the capital cost of the air movers and their maintenance is economically prohibitive. In addition, the system is noisy and disrupts the air in the runway corridor to such an extent that aircraft passing through the corridor are undesirably affected.

Another system of the prior art utilizes a string of closely spaced or continuous fires or burners, often termed 37 line" fires, to generate the desired heat. The heated air rises by convection and is carried over the runway by the prevailing wind. In its crudest version this was simply an open trench of burning fuel which produced tremendous quantities of heat and seriously polluted the air. In similar fashion, large heaters were spaced at intervals of 25 feet, for example, and this produced a Cumulative and excessive convection effect so great that the heated air was quickly carried to the higher reaches over the runway without appreciably heating the lower reaches. Another version of this approach utilized a line of closely spaced small burners to produce an essentially continuous line of heat sources. Such burners were intended to erect a curtain of heated air perpendicular to the prevailing flow of air toward the runway. However, in practice, although the burners used enormous amounts of fuel, the system failed to clear fog throughout the runway corridor, especially in the lower reaches of the corridor at low wind velocities and in the higher reaches at higher wind velocities. Apparently, the heated air rising from the burners went straight up in very low winds, was carried only across the upper reaches of the runway in a moderate wind, and was pressed down close to the runway under high wind conditions.

SUMMARY

According to the present invention, a fog dispersal system is provided for clearing fog from a predetermined area such as a runway by utilizing rows of heaters or burners of different intensities. These rows include a plurality of large or relatively high intensity heaters arranged in spaced apart relation along opposite sides of the runway, and similarly arranged rows of smaller heaters of various lower intensities. The large heaters are spaced apart sufficiently far from the smaller heaters that a considerable portion of the air mass flowing toward the runway passes to the smaller heaters relatively undisturbed and unheated by the large heaters. This permits a significant portion of this air mass to be independently heated by the smaller heaters so that the resulting plumes of heated air from the smaller heaters do not rise as far as those generated by the large heaters and are therefore located closer to the runway surface. These lower level plumes rise and expand to form generally horizontally oriented lower layers which merge beneath the upper layer of heated air formed by higher level plumes produced by the largest heaters. The smaller heaters are also spaced sufficiently far from one another that each produces an independent plume of heated air whose rise is essentially unaffected by the other heaters. This arrangement produces layers of lower level plumes which merge just above the runway to clear fog from the lower reaches of the runway corridor. In contrast, the heaters of so-called "line" fires are so close that each significantly affects the other, and an excessive updraft occurs which prevents clearing of fog in the critical strata immediately above the runway.

Thus, in accordance with the invention, the heater sizing and layout produce a plurality of merged, horizontal layers of heated, cleared air. Concomitantly, the independent plumes in each layer also merge or join up side-by-side. Moreover, because the more widely spaced larger heaters project heat convectively to a higher altitude in a given wind situation, less vertical diffusion about the plume axis is required to reach the desired ceiling. This results in a sharper drop-off in wasted heat passing to the air proceeding above the desired ceiling. The system is therefore more efficient than one having a string of lower intensity, essentially continuous line fires which must diffuse adequate heat farther from the plume axes in order to reach the desired ceiling.

The actual distribution or arrangement of the heaters relative to the runway or other area to be cleared is a function of the topography of the land, the wind velocity and direction encountered, the dimensions of the corridor to be cleared of fog, and the proximity of adjacent structures. However, in each application of the invention heat is introduced to the air mass in such a manner that the independent plumes of heated air are generated independently and rise to predetermined different levels so that their merger in layers over the runway results in a cleared area extending from the runway surface to the desired ceiling. No excessive convection occurs which might disturb aircraft, nor is any air distribution equipment required to direct heated air over the runway. This phenomenon of layered plumes is largely a result of the relative intensity, location, and spaced apart relation of the heaters.

The present invention is particularly adapted to situations where there is a prevailing wind, as just described. However, the present system also comprehends fog dispersion under conditions of no or low-wind velocity, and wind blowing down or longitudinally of the runway. Preferably this is accomplished by utilizing auxiliary heaters located close to the edges of the runway and arranged to blow or force heated air across the runway, as will be more particularly described hereinafter.

The heater layout of the present system lends itself to automatic or "push-button" control to select the operating heaters and set their intensities to maintain proper heating and clearing over the runway under shifting or changing wind directions and velocities. Wind velocity and direction sensors are utilized to provide electrical signals to a central controller or computer system operative to select appropriate burners and adjust their level of intensity to best meet the environmental conditions of the moment.

The present fog dispersal system is adapted to utilize blowers or the like to inject or introduce 1970, or other fog dispersal particles into the effluent from the heaters so that these particles can be carried up and be dispersed by the warmed plumes. The effect of the particles enables a reduction in the number and capacity of the heaters.

Other objects and features of the invention will become apparent from consideration of the following description taken in connection with the accompanying drawing.

DESCRIPTION OF THE PREFERRED EMBODIMENT

Figures 1, 2, 3:
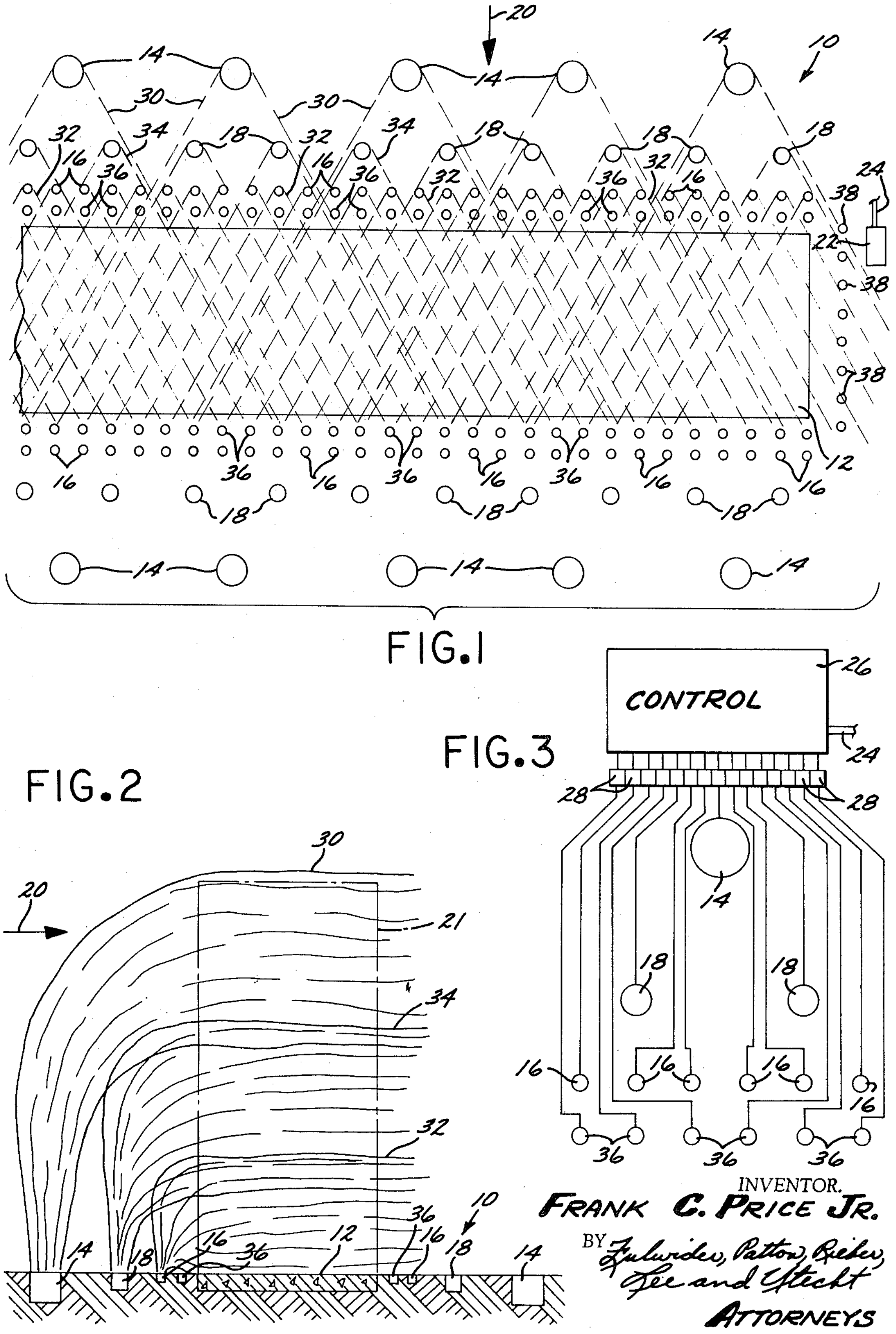
FIG. 1 is a plan view in diagrammatic form illustrating the present fog dispersal system located adjacent a portion of an airport runway.
FIG. 2 is an enlarged end elevational view of the airport runway of FIG. 1, illustrating the rising, expanding, and merging pattern of the plumes of heated air.
FIG. 3 is a diagrammatic view of typical control connections for a group of small, medium and large heaters at one side of the runway.

Referring now to the drawings, there is illustrated a fog dispersal system 10 located adjacent a usual airport runway 12. The system 10 is described in conjunction with the runway 12 by way of example only, and it will be apparent that the system 10 can be utilized with equal success in conjunction with various types of areas which are to be cleared of fog.

The fog dispersal system 10 comprises, generally, three rows of burners or heaters of different intensities or heating capacities on each side of the runway 12. There is an outer row of uniformly spaced apart, relatively high intensity or large heaters 14 on each side of the runway; an inner row of uniformly spaced apart, relatively low intensity or small heaters 16 on each side of the runway; and an intermediate row of medium intensity heaters 18 on each side of the runway.

It is noted that at least a portion of any air mass flowing with the prevailing wind 20 will pass between pairs of adjacent outer heaters 14 relatively undisturbed and unheated by such heaters. This portion of the air mass is then available for heating essentially only by the intermediate heaters 18. The same also applies for the inner heaters 16. That is, the location of the outer and intermediate heaters 14 and 18 is such that at least a portion of the air mass passing by them is not heated, but instead is first heated by the smaller, inner heaters 16.

As previously indicated, it is important that the air mass over the runway 12 be heated and disposed in generally horizontal layers or plumes of heated air. This is achieved by the previously described arrangement of the heaters 14, 16 and 18. The small heaters 16 closer to the runway create heated air plumes such that the prevailing wind 20 carries the heated air over the runway at a relatively low altitude. The large heaters 14 located farther from the runway create heated air plumes which rise to a greater height as they are carried over the runway by the prevailing wind. The intermediate intensity middle row of heaters 18 heat the air at a rate between that of the heaters 14 and 16 and create heated air plumes which are carried upwardly between the corresponding heated air plumes from the heaters 14 and 16.

The location of the small heaters 16 closer to the runway 12, the location of the intermediate heaters 18 more remote from the runway, and the location of the large heaters 14 still farther from the runway produces a lower layer of heated air from the heaters 16, a higher layer of heated air from the intermediate heaters 18, and a still higher layer of heated air from the large heaters 14. This arrangement of three rows on each side of the runway is preferred, but it is possible that the heaters could be arranged in two rows, or even in a single row on each side of the runway, if they were spaced from each other sufficiently that none would have a significant convection effect or updraft upon the others.

In the preferred arrangement of three rows of heaters on each side of the runway, the spacing between each pair of outer heaters 14 is relatively large compared to the corresponding spacing between each pair of inner heaters 16. In addition, as will be more particularly described hereinafter, the level of intensity of burning of each of the heaters 14, 16 and 18 is preferably adjustable for various conditions of wind velocity and direction. Also, the particular ones of the heaters selected for operation and the general heater layout or arrangement will vary somewhat in each application, depending upon the proximity and size of nearby buildings, the general topography of the surrounding terrain, and the wind and fog conditions normally experienced in the area. In each instance the prevailing cross-runway wind is utilized to develop horizontally oriented layers or plumes of heated air over the runway 12, the larger heaters producing the upper layers, the smaller heaters producing the lower layers, and the intermediate heaters producing layers between the upper and lower layers. In those cases where there is no appreciable prevailing wind, or the wind is down the runway, the present system does not provide the layered heating effect but, as will be seen, it is effective to disburse fog in these situations as well.

The particular construction and type of heater 14, 16 or 18 is not critical to the present invention, so long as each heater is capable of providing the level of heat output desired, is capable of generating heated plumes having the required rising effect and, in certain embodiments of the present system, is adapted to operate and adjust its operation in response to suitable control systems.

The plume rising effect of the particular heater determines the height of the axis of the plume over the area to be cleared and is influenced primarily by the heater intensity and, to a lesser degree, by the heater effluent outlet velocity and temperature. In addition, the inclination from vertical of the heater stack affects the plume rise and this can be used in some degree to create more heat with less rise, as needed in the particular situation.

Simple, air-aspirating, drilled-pipe burners are normally of low heating intensity and therefore not generally satisfactory for use in the present system. However, burner-blower combinations or self-evaporating, air-inducing liquefied petroleum gas burners are quite satisfactory because of their higher heating rates. Needless to say the type of heater should be capable of good combustion to avoid air pollution. The heaters may also be provided with hoods or air directional devices to provide some degree of control of the direction in which the plumes of heated air are generated, thus affecting to a controlled extent their rise characteristics. Suitable types of heaters along these lines are presently available and known to those skilled in the art.

In those versions of the present system which are coupled to control means for essentially automatic operation, the heaters will incorporate or be associated with suitable controllers, including actuating mechanisms to turn on the heater and adjust its level of burning and signal responsive devices to operate the actuating mechanisms.

In a typical installation of the present system, the runway, including the approach, touchdown, and runout areas, would be approximately 10,000 feet in length. For simplicity and flexibility of operation, such a runway length is divided into two or more zones, and the portion illustrated in the drawing is intended to designate one such runway zone. Each zone would be provided with its own wind velocity and direction sensor, one such sensor 22 being illustrated in FIG. 1. The sensors 22 are located in different zones about the runway and are capable of initiating electrical signals in response to the wind velocity and direction in that particular zone. Each is connected by suitable leads 24 to a control means 26. Suitable sensors for this purpose are well known.

The control means 26 is preferably automatic although it could be partially or completely manual, depending upon the particular airport installation and the need or desire for complete automation. In the essentially completely automatic system illustrated, the automatic control means 26 is responsive to electrical signals initiated by each sensor 22. Such signals indicate which of eight different zones of wind direction is involved and also indicates which of four wind velocity ranges exist in that particular wind direction zone. In response to these signals the control means 26 determines the control assignments for the plurality of controllers, each of which is diagrammatically indicated at 28 in FIG. 3, and each of which is associated with one of the plurality of heaters 14, 16 and 18.

Each controller 28 connected to one of the heaters is responsive to control signals from the control means 26 to operate blowers, adjust fuel input rates, damper settings, or the like as required to adjust the level of heat output to conform to the wind direction and velocity data coming from the sensor 22 to the control means 26. If desired, a single controller 28 could be used to control a bank or section of heaters rather than single heater, as will be apparent.

The control means 26 may take the form of a digital control means such as the Minneapolis-Honeywell Model H–112, which has 4,000 information locations, each with a 12-bit capacity. As previously mentioned, the input data for the control means would from the sensors 22 in the form of electrical signals indicating the wind velocity, direction, and direction variability relative to the runway 12. This input data is multiplexed in a device such as an MX–720 Honeywell Multiplexer (not shown), then converted in an analogue-to-digital converter, such as an ADC 708, and fed to the H–112. The H–112 control means, relying on its memory core, would determine which of the heaters are to be operated and what their level of heat output should be to meet the situation described d by the input data. This digital information is decoded within the H–112 control means and is applied to the addressees, in this case the controllers 28. In a typical embodiment, the control signal to a controller 28 would energize a signal responsive device such as an electrical relay which would in turn operate a heater actuating and adjusting mechanism such as a relay operated valve.

As the wind fluctuates in velocity and direction the control signals from the sensors 22 also change. Preferably the control means 26 is not immediately responsive to these changes, but has a delayed response so as not to "hunt" or cause rapid, successive turn-on and turn-off of the heaters until the wind condition change is pronounced and continuing in effect.

The memory core of the control means 26 is preferably previously fed data as to the expected changes in the diffusion coefficients of the air mass as the wind direction and strength changes, so that the control signals to the controllers 28 would be adjusted accordingly. Thus, when unusually low wind diffusion values prevail, the heater intensities would be increased to assure thorough heating of the air mass over the runway. This increased intensity for a given wind condition may also require changes in the heater exhaust direction and/or velocity and temperature to maintain the same axis height for the plume of heated air which is produced, as will be apparent.

A plume is not a definite size but is a Gaussian distribution of heat around the plume axis. In plume design calculations the edge of the plume is defined as the isotherm representing the minimum temperature rise required to clear the fog. This is between 2.5° and 5°F. With dirty fog having high concentrations of hygroscopic nuclei, the required temperature rise may be greater.

The efficiency of heating of the plume is affected by the evenness of distribution of temperature, excess temperature representing a loss in efficiency. Any heated air transported in the plume above the minimum desired cleared air ceiling represents also a loss, as does heat which diffuses out to the side of the runway, unless there is a requirement that adjacent taxiways be cleared of fog. Satisfactory heating is characterized by minimum loss out the top of the corridor to be cleared, and a minimum range of isotherms within the corridor.

Exemplary embodiments of the invention are shown in the following table, these embodiments each taking into account an assumed twenty percent heat loss out of the top of the corridor and a peak temperature in the plume 1.5°F above that at the edge of the plume. The heat loss out of the top of the corridor is projected to be somewhat less when the greater number of rows of burners are utilized. The table includes an embodiment for clearing a corridor 100 feet high in cross winds up to 4.4 miles per hour, and another embodiment for clearing a similar corridor in cross winds up to 8.8 miles per hour. Yet another embodiment is included for clearing a corridor 200 feet high. The corridor heights or ceilings are those at the runway approach area, as illustrated in the drawings, a lower ceiling in the order of 75 feet being satisfactory for the runout portion of the runway.

HEATER SPACINGS AND SIZES

| | | |
|---|---|---|
| Maximum Wind Velocity, Mph | 4.4 | 8.8 |
| Clearing 200' Ceiling: | | |
| Heating Capacity, $10^6$BTU hr$^{-1}$ ft$^{-1}$ | 0.4 | 0.8 |
| Number of Rows of Heaters | 2 to 5 | 2 to 7 |
| Distance of outermost row from runway, ft. | 500 to 1500 | 500 to 1500 |
| Distance of innermost row from runway, ft. | 100 to 1500 | 100 to 1500 |
| Clearing 100' Ceiling: | | |
| Heating Capacity, $10^6$BTU hr$^{-1}$ ft$^{-1}$ | 0.2 | 0.4 |
| Number of Rows of Heaters | 2 to 4 | 2 to 5 |
| Distance of outermost row from runway, ft. | 300 to 1000 | 300 to 1000 |
| Distance of innermost row from runway, ft. | 50 to 1000 | 50 to 1000 |

The data given is merely exemplary, and certain general rules must be observed in most installations. More particularly, the burner rows must be placed far enough from the runway to allow the plumes to expand by thermal diffusion until they adjoin before reaching the runway. They must join with a minimum of unevenness in temperature so that excess heat is not needlessly used, but there is an adequately high temperature prevailing to remove the existing fog.

The exact size and concomitant lateral spacing of the individual heaters cannot be precisely established without testing to calibrate the plume rise and spreading characteristics of layered adjoining plumes in a foggy wind. Furthermore, the turbulent nature of a specific fog is largely determined by the land and air temperature and the upwind terrain. Therefore, any given installation will necessarily require a range of heater intensities in all rows so as to accommodate changing fog properties, as well as changes in wind speed and direction.

The exemplary data in the above table was derived from experience gained in developing the layered, adjoining heated plume system of the present invention, and also from the Holland equation for calculating chimney plume rise, as set forth in the "Workbook of Atmospheric Dispersion Estimates" by D. Bruce Turner, U.S. Department of HEW, National Air Pollution Control Administration, Cincinnati, Ohio, 1969, Pub. No. 999–AP–26. This equation was modified by use of equations given in "Plume Rise" by G. A. Briggs, U.S. Atomic Energy Commission, 1969, TID–25075, and particularly Equation 5.7 at page 55. From these equations, it was assumed that a burner of size 6.0 × $10^6$ Btu/hr. will clear to 200 feet altitude in a wind of 4.4 mph. Then the other smaller burners required to clear the fog beneath the plume of this large heater are calculated using the relation: $h = kQ^{1/3}$, as indicated by Equation 5.7 in "Plume Rise." Based on this relation a multitude of rows are required to fill in with warm air all the space beneath the higher altitude large plume. That is, the higher the plumes of the largest heater, then the more rows of different heater sizes required.

In any event, it is believed that the low level fog condition probably will best respond to an arrangement of heaters which includes more than an inner and an outer row on each side of the runway.

The runway cross wind condition is best handled by having all of the burners or heaters on one side of the runway 12 operate to provide a cleared corridor 21 of air the full length of the runway zone. As the wind shifts, the sensors 22 located in the zones around the runway 12 would provide signals to the control means 26 indicative of such shifting. As will be apparent to those skilled in the controller art, the control means 26 would operate to turn off some of the heaters and adjust the intensity of burning of other heaters. In each case, the outer heaters 14 would supply heated plumes, designated 30 in FIG. 2, to the higher reaches above the runway 12, with the smaller heaters 16 supplying heated plumes 32 closer to the runway surface, and the intermediate heaters 18 supplying heated plumes 34 between the plumes 30 and 32. Each of these plumes rise, expand, and are swept into the corridor to be cleared over the runway 12, the general layered pattern of these plumes being best shown in FIG. 2.

An additional set of burners or heaters 36 is preferably provided especially to combat the no-wind or low wind velocity condition, as shown in FIG. 1. This set comprises a row of heaters 36 located on each side of and relatively close to the runway, such as 100 feet from the edge, at intervals approximately 40. The heaters 36 are preferably flush with the surrounding surface and blow 600°F air onto the runway. This clears fog over the runway by mixing, diffusion, and convection of the heated air with the foggy air mass over the runway.

The heaters 36 also assist in clearing fog in a down-the-runway wind condition, and also where the cross wind velocity is so low that the plumes from the large heaters 14 do not flow over the runway sufficiently to clear the fog at the higher altitudes.

In the down-the-runway wind condition, where the wind is moving down the runway in general alignment with its longitudinal axis, additional heaters 38 are preferably provided at the ends of the runway. By themselves these heaters 38 generally create only a relatively low cleared air ceiling, but the inner heaters 16 and the heaters 36 sustain and increase this cleared ceiling by providing heated air which rises and moves down the runway length.

Although three rows of heaters of different capacities have been described for use on the opposite sides of the runway, additional rows of the same or different heating capacities can also be provided if desired. However, it is believed that a minimum of one row of heaters 14 and one row of heaters 16 on each side of the runway is needed to handle foggy winds flowing across or transversely of the runway.

Since the heated plumes 30 expand farther as their distance from the runway increases, the proper distance at which the heaters 14 must be located from the runway is primarily a function of the maximum wind velocity to be handled. Thus, at the higher wind conditions the maximum intensity of the large heaters 14 would be utilized. The stronger updraft created at the maximum intensity then drives the axes of the plumes 30 high enough in the corridor 21 despite the higher wind conditions. Of course, in such a case the plumes 30 reach the runway more quickly because of the higher wind speed. Consequently, the heaters 14 have to be located far enough away from the runway to give each plume time to expand radially outwardly from its plume axis to bridge the space to the adjacent plume. Although it would be possible to space the heaters 14 closer to one another to accomplish such bridging, rather than spacing them farther from the runway, this would cause excessive and uneconomical heating in the corridor. Therefore, as previously indicated, the most effective design for the higher wind velocity condition utilizes heaters 14 spaced farther from the runway. The intensity of burning of the heaters 14, 16 and 18 are then adjustable to provide satisfactory lifting and spreading of warm air under a variety of wind conditions below the maximum condition just mentioned.

The dispersed arrangement of the heaters 14, 16 and 18 produces three dimensional layered plumes 30, 32 and 34 of heated air. These plumes have a relatively low intensity per unit area and thereby avoid excessive convection currents. The plumes or stream tubes of heated air expand and cool by passively mixing with the surrounding air, and finally merge or connect with each other over the runway in a horizontally oriented, layered arrangement for clearing the runway corridor of fog. In contrast, prior art line burners produce a heated curtain of air which includes excessive convection currents and either rises too high and misses the lower part of the runway, or does not rise high enough before reaching the runway.

The selection of a range of appropriate sizes of heaters for each particular application should be such as to produce efficient joining of the plumes of heated air in stacked layers over the runway and in the approach zone. Heater effluent velocity, heater effluent diameter, and effluent temperature are then adjusted, preferably under the control of an associated automatic control system, to obtain the desired height of the plume axis under the particular wind and fog conditions. Where the shape of the terrain or the presence of buildings complicates the placement area for the heaters, they can be moved farther from the runway 12 or even placed on roof tops. Of course, their intensities must be adjusted to account for their distant or high position.

In making adjustments in the system for particular local conditions, the results can be achieved by changing the number of rows of heaters of different intensities on each side of the runway. As previously indicated, the main consideration dictating the size and location of the heaters is the maximum wind speed anticipated during fog clearing, although the upwind terrain influencing air turbulence an mixing is also a factor, and certain adjustments will have to be made from observation of the actual plume rise experienced.

Figure 4:
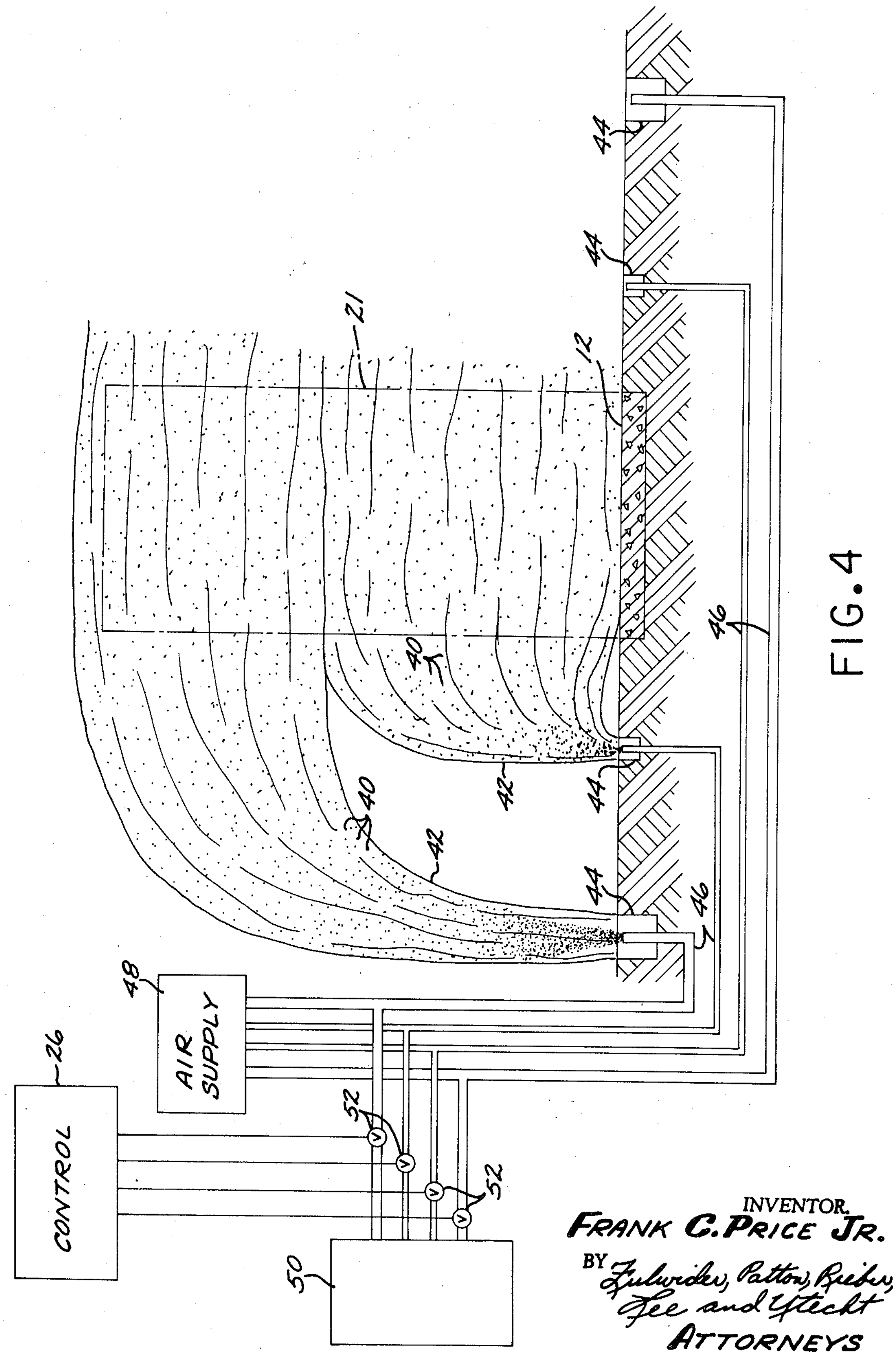
FIG. 4 is a diagrammatic view of a typical heater arrangement for introducing fog dispersal particles in the heater effluent.

Referring now to FIG. 4, there is illustrated a heater system for introducing fog dispersal particles 40 into the effluent or warm air plume 42 of each of a plurality of burners or heaters 44. The system is shown in block diagram form for brevity, and it will be understood that the heaters 44 are arranged along the sides of the runway 12 in a manner generally similar to the arrangement of the heaters 14, 16, and 18 in the embodiment of FIG. 1. However, the heaters 44 are of lesser capacity, fewer in number, there are fewer rows of the heaters 44, and they are usually spaced farther from the area to be cleared, as will be seen.

The use of fine fog dispersal solids or particles is well known, the particles acting to clear the fog by collision with the water droplets as the more dense particles pass through the fog, and also by the drying action of the solids, if they are hygroscopic in character.

Airplanes have been used to drop the particles through the fog, but this has proved to be ineffective because of the costs involved, the difficulty in hitting the target area, and the danger of employing low-flying aircraft under fog conditions. The particles have also been injected into the fog from the ground by means of air blowers, using between 0.003 and 0.015 grams of solids per cubic meter of fog, but difficulty was experienced in achieving the desired height of distribution.

According to the present invention, the concept of utilizing fog dispersal particles is combined with the concept of providing merging, heated, and horizontally layered plumes through the area to be cleared. By utilizing fog dispersal particles 40 the number of heaters 44 can be reduced over a system using heat alone. Moreover, the capacity of the heaters need not be as great, although the reduction in heater rows, number of heaters, and heater capacity means that the heaters generally have to be located farther from the runway in order to allow the plumes to rise high enough and disperse widely enough prior to reaching the runway area.

The solids or particles 40 are added to the effluent of each heater 44 for dispersion by an suitable means, such as by utilizing a stream of air from a blower or a compressed air line 46, as indicated diagrammatically in FIG. 4. Suitable techniques for dispersing particles in a stream of air are well known and therefore will be omitted for brevity. Generally, a system like that of FIG. 4 would include an air compressor and storage unit 48, a supply 50 of dispersal particles 40 coupled to the discharge from the unit 48, and suitable air flow control valves 52 so that a metered quantity of particles are carried by a controlled flow of air through the air line 46 into the heater effluent. The weight concentration of the particles 40 varies with the particular application, the proper concentration depending upon particle size distribution, particle hygroscopicity, fog droplet content and diffusion coefficient, and other parameters.

Use of the particles 40 allows minimal use of heat in the system of FIG. 1. Also, depending upon the constraints on heater size and placement, such a system affords an opportunity to vary the relative amounts of heat added and particles 40 injected so as to achieve an optimum balance for any of a variety of fog and wind conditions. This adds considerable flexibility to the system of FIG. 1, which employed heat alone in the rising, expanding, and merging plumes 30, 32, and 34.

Summarizing the foregoing, a system is provided for clearing fog from an airport corridor 30 by creating a temperature rise in the order of 3°F to 5°F. This is achieved by employing a plurality of relatively inexpensive heaters which produce layered heated plumes through passive utilization of the prevailing winds, natural convection of the heated plumes, and natural heat diffusion occurring in the air masses. These agents for heat transport eliminate any need for expensive air movers such as jet engines or the like.

Various modifications and changes may be made with regard to the foregoing detailed description without departing from the spirit of the invention.

I CLAIM:

1. A method of clearing fog from a predetermined area, comprising:

distributing a plurality of sets of heaters in spaced apart relation along at least one side of said area, said sets being of different relative intensities with heaters of lower intensity sets being disposed closer to said area than heaters of relatively higher intensity sets;

generating generally conically shaped plumes of heated air from the heaters of each of said sets, each individual plume being substantially independent from the plumes generated by all of the other heaters, both from the same set and from the remaining sets, each of said individual plumes rising upwardly and, in response to prevailing wind conditions, expanding over said area, the individual plumes of each heater set merging, at least over said area, to form a horizontally oriented layer of heated air located at a height corresponding to the relative intensity of the respective heater set, whereby the plumes of heated air from said plurality of heater sets rise and expand over said area in the form of stacked, horizontally oriented layers located at heights corresponding to said relative intensities, the uppermost layer corresponding to the highest intensity heater set, and whereby said stacked layers of heated air clear said area of fog.

2. The process of claim 1, wherein the spacings between the heaters of each of said sets defines air flow paths for portions of said air mass flowing toward said area whereby the rate of convection at the base of the rising plume of heated air for each of said heaters is not significantly affected by that of the others of said heaters.

3. The process of claim 1, including the step of introducing fog dispersal particles into the effluent from said sets of heaters whereby said particles are carried with said plumes over said area in said layers.

4. The process of claim 3, wherein said particles are hygroscopic in character.

5. The process of claim 1, further including the sensing of the prevailing wind direction and velocity, and adjusting the level of heating of said first and second heat sources responsive to said sensing.

6. A process for clearing fog from a predetermined area, comprising the steps of:

generating a plurality of separate, generally conically shaped plumes of heated air from an outer row of relatively high intensity heaters, said heaters being in spaced apart relation along at least one side of said area; and generating a plurality of separate, generally conically shaped plumes of heated air from at least one inner row of relatively lower intensity heaters, said inner rows of relatively lower intensity heaters extending in spaced apart relation and located between said outer row and said area, said inner rows extending in generally coextensive relation with said outer row, the spacing between said high intensity heaters enabling some portion of any air mass flowing across said outer row toward said area to pass between said high intensity heaters relatively undisturbed and unheated to said lower intensity heaters, thereby to enable plumes of heated air from said lower and higher intensity heaters to produce substantially independent lower and higher layers of heated air over said area as a result of the passive rising, expanding, and mutual intersecting of said plumes as said air mass is carried across said area.

7. The process of claim 6, wherein said outer row and said inner rows are duplicated on the opposite side of said area, whereby said outer and inner rows on either side of said area can be selectively operated according to the direction of the prevailing wind.

8. The process of claim 6, further including the step of introducing fog dispersal particles into the effluent from said lower and higher intensity heaters whereby said particles are carried with said plumes over said area in said layers.

9. The process of claim 8, wherein said particles are hygroscopic in character.

* * * * *

UNITED STATES PATENT OFFICE
CERTIFICATE OF CORRECTION

Patent No. 3,712,542 Dated January 23, 1973

Inventor(s) Frank C. Price, Jr.

It is certified that error appears in the above-identified patent and that said Letters Patent are hereby corrected as shown below:

In the claims, claim 1, line 1, delete "method"

Signed and Sealed this

Twenty-fifth Day of January 1977

[SEAL]

*Attest:*

RUTH C. MASON
*Attesting Officer*

C. MARSHALL DANN
*Commissioner of Patents and Trademarks*

UNITED STATES PATENT OFFICE
CERTIFICATE OF CORRECTION

PATENT NO. : 3,712,542

DATED : January 23, 1973

INVENTOR(S) : Frank C. Price, Jr.

It is certified that error appears in the above-identified patent and that said Letters Patent are hereby corrected as shown below:

Column 11, line 34, "method" should read --- process ---.

This certificate supersedes the certificate which issued January 25, 1977.

Signed and Sealed this

Twelfth Day of April 1977

[SEAL]

*Attest:*

RUTH C. MASON
*Attesting Officer*

C. MARSHALL DANN
*Commissioner of Patents and Trademarks*